United States Patent [19]

Soma et al.

[11] Patent Number: 4,996,625
[45] Date of Patent: Feb. 26, 1991

[54] POWER SOURCE UNIT FOR IMAGE RECORDING APPARATUS

[75] Inventors: Utami Soma; Yasufumi Koseki; Minoru Asakawa, all of Hachioji, Japan

[73] Assignee: Konica Corporation, Tokyo, Japan

[21] Appl. No.: 400,500

[22] Filed: Aug. 30, 1989

[30] Foreign Application Priority Data

Sep. 2, 1988 [JP] Japan .................. 63-220755

[51] Int. Cl.⁵ ........................................ H02H 3/08
[52] U.S. Cl. .................................. 361/87; 361/93; 307/38; 307/41
[58] Field of Search ............... 361/18, 93, 102, 87; 307/29, 38, 41

[56] References Cited

U.S. PATENT DOCUMENTS 3,280,374 10/1966 McCartney et al. .............. 361/93
4,466,041 8/1984 Witulski et al. .................. 361/18

Primary Examiner—Todd E. DeBoer

[57] ABSTRACT

A power source unit for an image recording apparatus having a CPU which controls an operation sequence of a load, includes a current sensor and a relay. The current sensor senses a load current. The relay is connected to a supply path to the load. The relay is operated to interrupt the supply path to the load when the CPU determines that the load current sensed by the current sensor exceeds a current limit value which is determined in advance for every operation cycle of the unit.

6 Claims, 2 Drawing Sheets

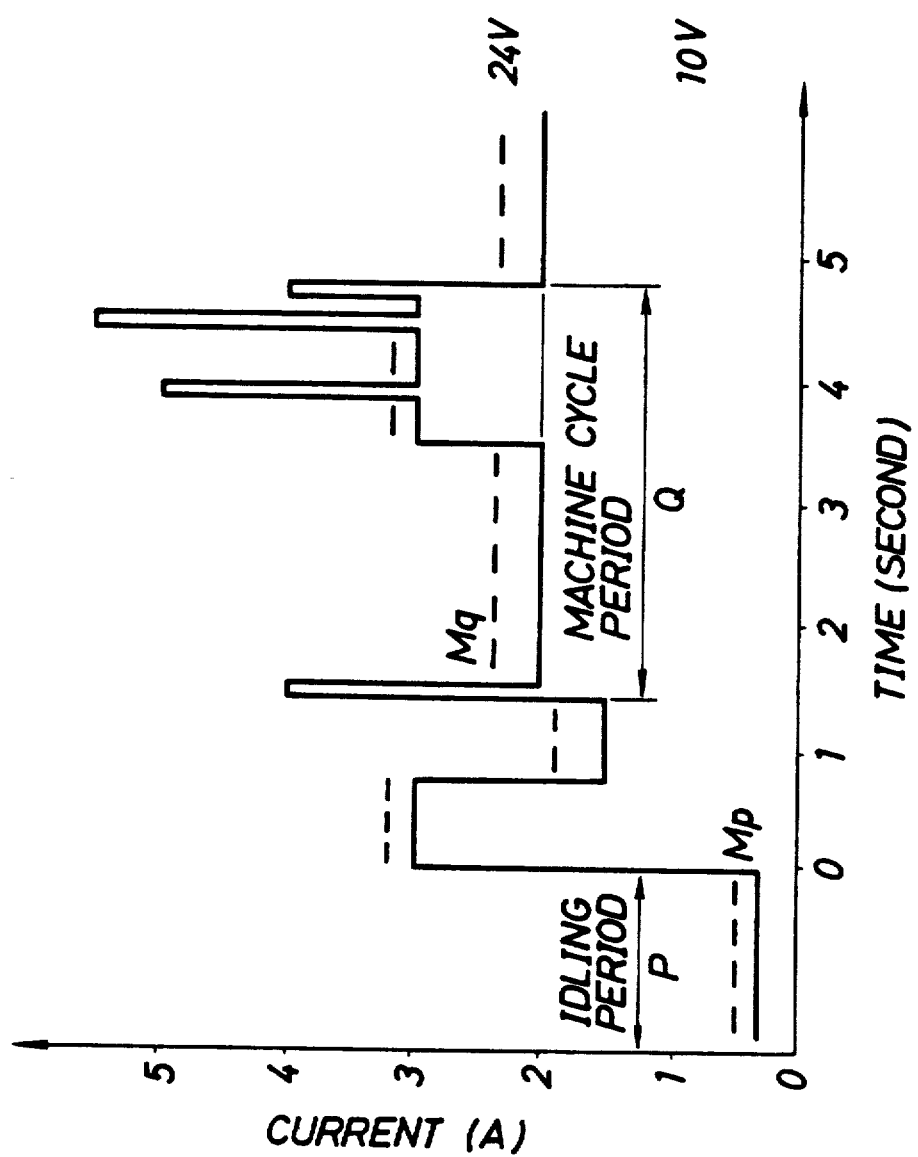

POWER SOURCE UNIT FOR IMAGE RECORDING APPARATUS

BACKGROUND OF THE INVENTION

1. Field of the Invention

The present invention relates to a power source unit for an image recording apparatus such as a copying machine.

2. Description of the Prior Art

In an image recording apparatus such as a copying machine using a motor, a clutch, and a CPU (Central Processing Unit) and an IC (Integrated Circuit) which later two are associated therewith, a power source unit for outputting a plurality of different stabilized voltage values has been frequently used. The power source unit is used to drive, e.g., an electromagnetic coil such as a motor, a clutch, or a solenoid, and is also used as a power source for a plurality of high voltages. When interlayer short-circuiting or the like occurs in such coil parts, however, an overcurrent flows. Therefore, chain faults are caused, smoke or the like is emitted, and parts in associated circuits are damaged, thus exhibiting a dangerous state. Therefore, the following methods have been employed. A sensor may be additionally arranged in a terminal portion of each conventional circuit, and the sensor is connected to a CPU to perform a monitor operation. A large number of fuses are arranged in a terminal portion of each circuit to prevent the above-mentioned danger.

As described above, a monitoring method by a CPU is employed in the conventional apparatus. In this method, however, various and a large number of current and position sensors are required. Therefore, an I/O port for connecting the CPU is complicated, and cost of the circuit is undesirably increased. In addition, in a method of arranging fuses, a current value is changed depending on an operation cycle of the apparatus. Therefore, a small number of fuses are ineffective, and it is difficult to select an optimal fuse value, in practice. For this reason, a great number of fuses must be additionally arranged for components of the electronic circuit, and hence cost is increased.

SUMMARY OF THE INVENTION

It is an object of the present invention to provide a power source unit for an image recording apparatus having a failsafe circuit in which a CPU time-serially monitors an overcurrent in accordance with an operation cycle of the image recording apparatus to interrupt a power source path of the apparatus, thus preventing danger.

In order to achieve the above object, there is provided a power source unit for an image recording apparatus in which a CPU controls a sequence, comprising a current sensor and a means for interrupting a power source supply path to loads, wherein the CPU time-serially senses generation of an overcurrent during each operation cycle to interrupt the power source supply path upon the occurrence of an abnormality.

BRIEF DESCRIPTION OF THE DRAWINGS

FIG. 2 is a timing chart showing an operation cycle of the image recording apparatus and a current value during each cycle period.

DETAILED DESCRIPTION OF THE PREFERRED EMBODIMENT

Figure 1:
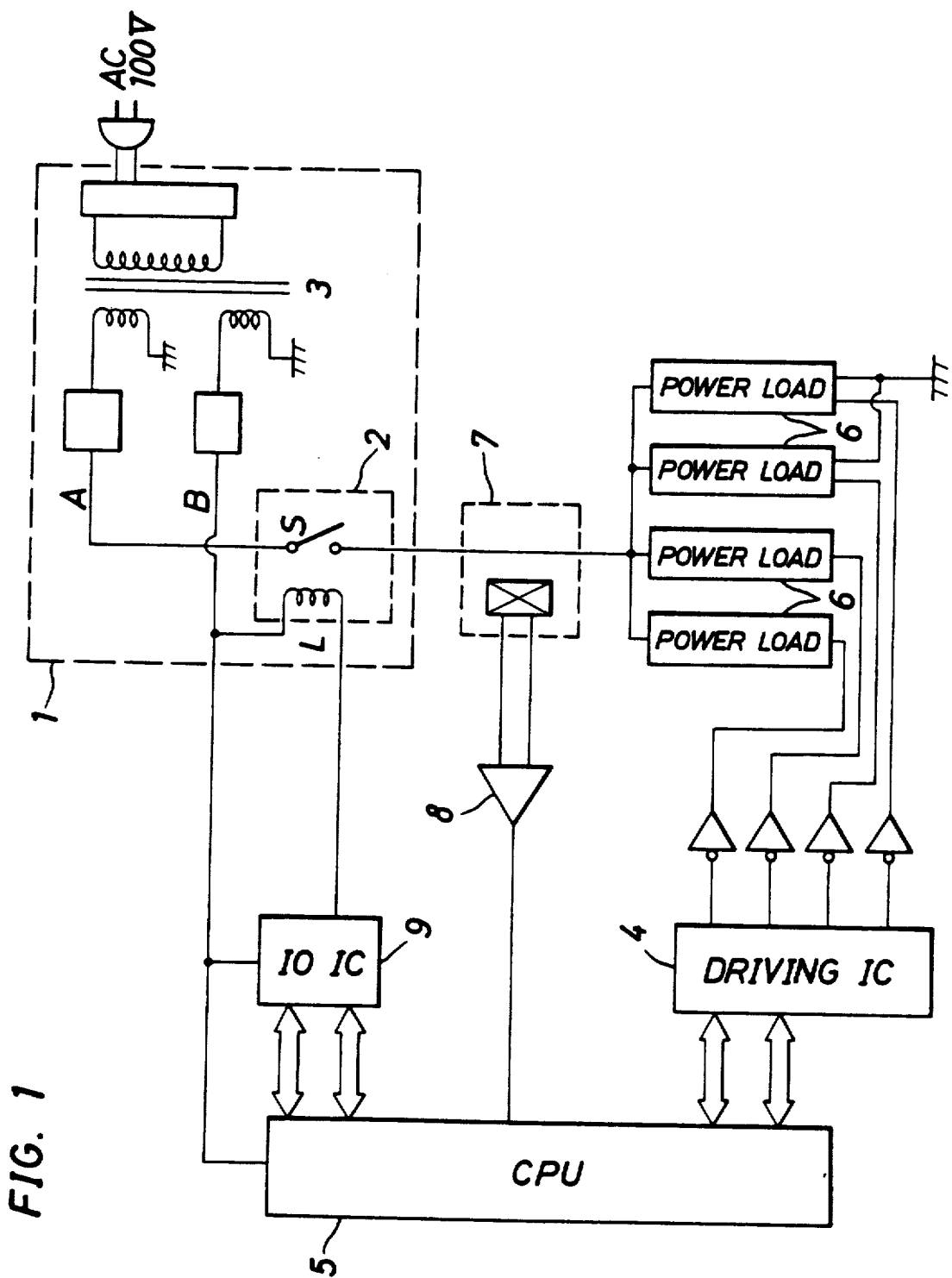
FIG. 1 is a block diagram showing an arrangement of an electronic circuit in an image recording apparatus using a power source unit according to an embodiment of the present invention.

The present invention will be described below with reference to the accompanying drawings.

FIG. 1 shows an arrangement of an electronic circuit of an image recording apparatus using a power source unit according to an embodiment of the present invention. In this embodiment, a power source unit for outputting two different voltages, i.e., a power voltage (24 V) A and a voltage (5 V) B for an IC and a CPU is exemplified.

As shown in FIG. 1, a power source section 1 normally receives an AC voltage of 100 V. The received voltage is transformed into the power voltage (24 V) A and the IC voltage 5 V) B by a transformer 3. Although not shown in detail, each voltage is rectified, smoothed, and stabilized by an IC or the like. The DC voltage 5 V) B is connected to mainly drive the IC and the CPU, and the DC power voltage (24 V) A is connected to a plurality of power loads 6 such as motors through a contact S of a relay 2. An operation of the relay 2 will be described later. These power loads 6 are driven in response to a control operation performed by a CPU 5. Therefore, the power loads 6 are connected to the CPU 5 through a driving IC 4. A current sensor 7 including a Hall element is arranged in a supply path for supplying the power voltage A from the contact S of the relay 2 to each load. In order to sense an overcurrent, a sense signal is amplified by an amplifier 8, and the amplified signal is input to the CPU 5. One terminal of a drive coil L in the relay 2 is connected to the voltage 5 V) B, and the other terminal of the coil L is connected to the CPU 5 through an I/O IC 9. During a drive operation of the image recording apparatus, the contact S of the relay 2 is controlled by the CPU to be normally kept closed.

FIG. 2 is a timing chart showing an operation cycle of the image recording apparatus and a current value during each cycle period.

Referring to FIG. 2, a solid line represents a current value of each operation cycle of the image recording apparatus. A thick broken line represents each current limit value Mi during the corresponding cycle period. A period P is an idling period, and a period Q is a machine cycle period. Each current peak value has a time width of 50 ms or less. Note that although a current limit value during the period P may be represented by "Mp", and a current limit value during the period Q may be represented by "Mq", these values are generally represented by "Mi" in this case.

The current limit value Mi during each period of the operation cycle is programmed in the CPU 5 in advance. During each period, the CPU always monitors whether a current value exceeds the current limit value Mi.

In a given copying machine, the power voltage A (24 V) hardly drives the power loads during the idling period Therefore, current consumption is only 0.2 A to 0.3 A. During a copying period, however, the power loads are driven as needed, and hence a root-mean-square (rms) current is changed to fall within the range of about 0.2 A to 3 A. In addition, since a rush current is generated upon initialization and reverse rotation in, e.g., the motor loads, a transient current of about 5.5 A is generated. As described above, however, since each sequence is controlled by the CPU, a current value at each sequence point is not largely changed during a normal operation, and is the current limit value Mi or less.

If some abnormal operation occurs in the power loads 6, the current sensor 7 senses the overcurrent, and supplies an overcurrent electrical signal to the CPU 5 through the amplifier 8. The CPU 5 includes a control means therein for time-serially checking the current limit value Mi during each period of the operation cycle which is programmed (i.e., stored) in advance for every period. If it is determined by CPU 5 that an abnormality occurs, i.e., the current value exceeds the current limit value Mi, an electrical signal is output from the CPU 5 through the I/O IC 9 to release holding of the relay 2, and the contact S of the relay 2 is opened. Therefore, supply of the power voltage A to the loads 6 is interrupted, and damage to or burning of the power loads 6 can be prevented. In addition, danger such as a chain fault of, e.g., the associated loads can be prevented.

When one current sensor is arranged with respect to one power source output in a power source unit having a plurality of voltage outputs, the present invention can be used in a variety of applications.

The above-mentioned electronic circuit according to the present invention is operated on the basis of control by the normal power source unit and the CPU. The current sensor, the relay, and the like which are additionally arranged in the normal circuit can be easily arranged utilizing the normal electronic parts at low cost.

As described above, in the conventional method of monitoring an overcurrent using a CPU, a large number of various current sensors are required, and hence an I/O port for connecting the CPU is complicated. In a method of arranging fuses, a small number of fuses is ineffective, and it is difficult to select an optimal fuse value, in practice. Therefore, a great number of fuses must be additionally arranged for components of the electronic circuit. In the above methods, cost is undesirably increased. According to the present invention, however, there is provided a power source unit for an image recording apparatus having a failsafe circuit in which a very small number of current sensors and relays are used, and a safe and reliable operation can be achieved by CPU monitoring.

What we claim is:

1. In an image recording apparatus having a central processing unit (CPU) which controls operation sequences of a load during respective operation cycles of the image recording apparatus, a power source unit for supplying power to the load, comprising:
   means defining a power supply path to said load;
   current sensing means which senses a load current;
   current interrupting means connected to said power supply path for interrupting said power supply path;
   means which stores in advance a plurality of predetermined current limit values at least one said value corresponding to each operation cycle to be performed by said image recording apparatus; and
   control means in said CPU operating said current interrupting means for interrupting said power supply path to said load when said CPU determines that the load current sensed by said current sensing means exceeds said predetermined current limit value for the corresponding operation cycle being performed by said image recording apparatus.

2. A power source unit according to claim 1, wherein said current sensing means is connected to said power supply path for sensing the current flowing in said power supply path.

3. A power source unit according to claim 1, wherein the operation cycles include at least idling and machine cycle periods.

4. A power source unit according to claim 1, wherein said current sensing means comprises a Hall element.

5. A power source unit according to claim 1, wherein said current interrupting means comprises a relay.

6. A power source unit according to claim 1,
   including means for outputting at least two voltages, at respective voltage output terminals, one of said at least two voltages being higher than the other of said at least two voltages; said current sensing means being connected to sense a load current fed to a load connected to a voltage output terminal for outputting said higher voltage; and
   said current interrupting means being connected at least to the power supply path to said load connected to said voltage output terminal for outputting said higher voltage.

* * * * *